United States Patent
Ichikawa et al.

(10) Patent No.: US 11,155,244 B2
(45) Date of Patent: Oct. 26, 2021

(54) FOREIGN MATERIAL REMOVING DEVICE AND VEHICLE PROVIDED WITH THIS FOREIGN MATERIAL REMOVING DEVICE

(71) Applicant: KOITO MANUFACTURING CO., LTD., Tokyo (JP)

(72) Inventors: Yasuhiro Ichikawa, Shizuoka (JP); Akinobu Kubota, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 101 days.

(21) Appl. No.: 15/740,877

(22) PCT Filed: Jun. 29, 2016

(86) PCT No.: PCT/JP2016/069336
§ 371 (c)(1),
(2) Date: Dec. 29, 2017

(87) PCT Pub. No.: WO2017/002879
PCT Pub. Date: Jan. 5, 2017

(65) Prior Publication Data
US 2018/0194330 A1    Jul. 12, 2018

(30) Foreign Application Priority Data

Jun. 30, 2015 (JP) .............................. JP2015-131789
Jun. 30, 2015 (JP) .............................. JP2015-131790

(51) Int. Cl.
*B60S 1/62* (2006.01)
*B60S 1/56* (2006.01)
(Continued)

(52) U.S. Cl.
CPC ................ *B60S 1/62* (2013.01); *B05B 1/005* (2013.01); *B05B 9/0413* (2013.01); *B60S 1/54* (2013.01); *B60S 1/56* (2013.01); *F04B 35/01* (2013.01)

(58) Field of Classification Search
CPC .... H04N 7/18; H04N 5/22521; H04N 5/2171; B05B 1/005; B05B 9/0413; F04B 35/01;
(Continued)

(56) References Cited

U.S. PATENT DOCUMENTS 3,461,806 A * 8/1969 Barthalon .............. H02K 33/12
                                                                417/418
5,708,859 A    1/1998 Tajima et al.
(Continued)

FOREIGN PATENT DOCUMENTS

CN        2776773 Y     5/2006
CN       103043035 A    4/2013
(Continued)

OTHER PUBLICATIONS

Communication dated Jan. 15, 2019, issued by the European Patent Office in counterpart European Patent Application No. 16817987.7.
(Continued)

*Primary Examiner* — Steven M Cernoch
(74) *Attorney, Agent, or Firm* — Sughrue Mion, PLLC

(57) ABSTRACT

A foreign matter removal device (1) is configured to remove foreign matters on a lens (101) of an in-vehicle camera (100) attached to a vehicle so that the lens (101) of the in-vehicle camera (100) is exposed toward an outside of a body panel of the vehicle. The foreign matter removal device includes a single-cylinder type reciprocating pump (5) configured to generate high-pressure air and a nozzle (22) configured to inject the high-pressure air toward the lens (101). A volume of an internal space of the pump is 10 cm³ or less. Exhaust
(Continued)

time (t1) per cycle required for exhausting the air in the internal space is 0.03 seconds or less.

16 Claims, 10 Drawing Sheets

(51) Int. Cl.
*B60S 1/54* (2006.01)
*B05B 1/00* (2006.01)
*B05B 9/04* (2006.01)
*F04B 35/01* (2006.01)

(58) Field of Classification Search
CPC ........ F04B 35/04; F04B 39/0016; F04B 9/02; F04B 9/04; F04B 2201/0206; F04B 2201/0209; F04B 2201/08; F04B 2205/03; F04B 2205/09; F04B 2207/042; F04B 2207/043; B60S 1/54; B60S 1/56; B60S 1/62; B60R 11/04
USPC ............................................. 239/284.1–284.2
See application file for complete search history.

(56) References Cited

U.S. PATENT DOCUMENTS

| | | | |
|---|---|---|---|
| 10,059,280 B2* | 8/2018 | Cooper | B60R 11/04 |
| 2013/0092758 A1 | 4/2013 | Tanaka et al. | |
| 2013/0219742 A1* | 8/2013 | Field | B60S 1/0848 34/491 |
| 2015/0078940 A1 | 3/2015 | Kikuta et al. | |
| 2015/0343999 A1 | 12/2015 | Lopez Galera et al. | |
| 2017/0028968 A1 | 2/2017 | Kubota et al. | |

FOREIGN PATENT DOCUMENTS

| | | |
|---|---|---|
| EP | 2878999 A1 | 6/2015 |
| EP | 3239006 A1 | 11/2017 |
| JP | 59-50201 A | 3/1984 |
| JP | 9-292656 A | 11/1997 |
| JP | 11-321585 A | 11/1999 |
| JP | 2001-171491 A | 6/2001 |
| JP | 2004-202145 A | 7/2004 |
| JP | 2012-201122 A | 10/2012 |
| JP | 3182524 U | 4/2013 |
| JP | 2014-69586 A | 4/2014 |
| JP | 2015-83830 A | 4/2015 |
| JP | 2015-224032 A | 12/2015 |
| WO | 2015/159763 A1 | 10/2015 |

OTHER PUBLICATIONS

Search Report dated Oct. 4, 2016, issued by the International Searching Authority in counterpart International Patent Application No. PCT/JP2016/069336 (PCT/ISA/210).

Written Opinion dated Oct. 4, 2016, issued by the International Searching Authority in counterpart International Patent Application No. PCT/JP2016/069336 (PCT/ISA/237).

Communication dated Dec. 14, 2020 issued by the State Intellectual Property Office of P.R. China in counterpart Chinese Application No. 201680038322.2.

Wu Derong, "Industrial Design of Chemical Plant, vol. 2", East China University of Science and Technology Press, Aug. 31, 2014, p. 122 (5 pages total).

Communication dated Apr. 26, 2021, from The China National Intellectual Property Administration in Application No. 201680038322. 2.

* cited by examiner

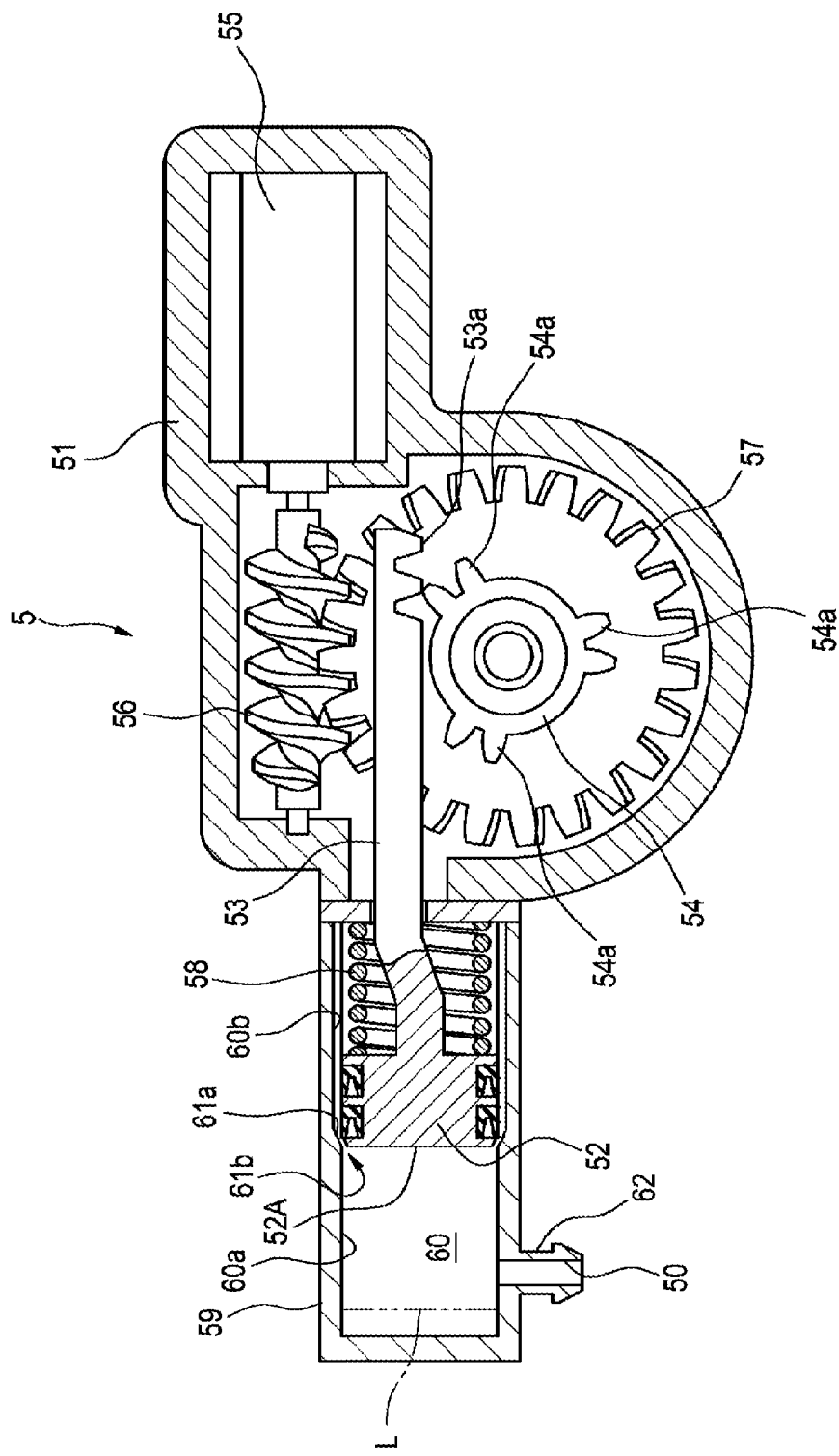

FOREIGN MATERIAL REMOVING DEVICE AND VEHICLE PROVIDED WITH THIS FOREIGN MATERIAL REMOVING DEVICE

TECHNICAL FIELD

The present invention relates to a foreign matter removal device for removing foreign matters adhering to a lens of an in-vehicle camera by injecting high-pressure air or the like from a nozzle, and a vehicle having the foreign matter removal device.

BACKGROUND ART

Recently, the number of vehicles equipped with in-vehicle cameras for photographing the situations around the vehicle is increasing. In the in-vehicle cameras, there is a case that a lens as an imaging surface becomes dirty due to rain, mud or the like. Therefore, conventionally, a foreign matter removal device for removing foreign matters by blowing cleaning liquid or high-pressure air or the like to the lens of the in-vehicle camera in order to remove foreign matters such as water droplets adhering on the lens has been known (see Patent Document 1).

In such a foreign matter removal device, the performance of removing foreign matters may be deteriorated when the positioning accuracy of the tip end of the nozzle with respect to the lens of the camera is low. Therefore, for example, a structure has been proposed in which a dedicated bracket for attaching a camera on a body panel of a vehicle is provided, and a nozzle is positioned with respect to an upper surface of a housing of a camera via the dedicated bracket (see Patent Document 2).

Further, Patent Document 1 discloses a configuration in which a compressed air generation unit is installed in the vicinity of an in-vehicle camera, compressed air generated by the compressed air generation unit is injected from a nozzle so that high-pressure air is blown to a front glass of the in-vehicle camera, thereby removing water droplets adhering to the front glass.

CITATION LIST

Patent Document

Patent Document 1: Japanese Patent Laid-Open Publication No. 2001-171491
Patent Document 2: Japanese Patent Laid-Open Publication No. 2014-69586

DISCLOSURE OF INVENTION

Problems to be Solved by Invention

In the case of removing foreign matters by blowing compressed air onto a lens of a camera, means for temporarily increasing the wind speed by decreasing an opening area of a nozzle or arranging a check valve in an air flow passage to accumulate pressure can be considered in order to increase the flow velocity of air blown onto the lens. However, since the range where air can be blown onto the lens becomes narrow when the opening area of the nozzle is decreased, it is necessary to increase the size of a pump. Further, when a check valve is mounted, a pump structure capable of withstanding accumulated pressure is required, and thus, the configuration is complicated.

Further, in the configuration as disclosed in Patent Document 1, when compressed air is generated by the compressed air generation unit, water or the like may flow backward from a nozzle and enter the compressed air generation unit. Accordingly, there is a possibility that the compressed air generation unit is damaged or broken and compressed air with a desired pressure cannot be generated.

The present invention aims to provide a foreign matter removal device which is capable of achieving the size reduction and simplification of the structure while maintaining the performance of removing foreign matters and preventing the reverse flow of water or the like, and a vehicle provided with the foreign matter removal device.

Means for Solving the Problems

The foreign matter removal device according to the present invention removes foreign matters on a lens of an in-vehicle camera attached to a vehicle so that the lens of the in-vehicle camera is exposed toward the outside of a body panel of the vehicle, the foreign matter removal device including:

a single-cylinder type reciprocating pump for generating high-pressure air; and a nozzle for injecting the high-pressure air toward the lens, in which a volume of an internal space of the pump is 10 $cm^3$ or less, and the exhaust time per cycle required for exhausting the air in the internal space is 0.03 s or less.

According to the above configuration, the air in the pump having a small volume of 10 $cm^3$ or less can be instantaneously exhausted, and water droplets on the surface of the lens can be appropriately moved without causing an increase in the volume of the pump, so that it is possible to achieve the compatibility between the maintaining of the foreign matter removal performance and the size reduction of the device.

The flow rate of the pump may be 50 $cm^3/s$ or more during 0.02 s of the exhaust time required.

According to the above configuration, since the pump is used at a high flow rate region for a certain period of time, water droplets can be more reliably removed.

The maximum flow rate in the exhaust per cycle of the pump may be 100 $cm^3/s$ or more.

According to the above configuration, by setting the maximum flow rate to a certain value or more, water droplets can be more reliably removed.

The exhaust from the pump may be performed at least once per second.

According to the above configuration, by performing the exhaust from the pump a plurality of times in a short cycle, it is possible to quickly remove water droplets newly adhering to the surface of the lens after removing water droplets without giving any discomfort to a driver.

An angle formed by a line passing through the center of an ejecting port of the nozzle and a tangential line of the apex of the lens may be 0° or more but 60° or less.

The line passing through the center of the ejecting port of the nozzle may intersect with a second region which is a second portion from the top of the lens when the lens is divided into six equal parts in the upper and lower direction.

The pump may include a piston for feeding out the high-pressure air, and a spring for urging the piston in a feeding direction of the high-pressure air.

The pump may include a rack-and-pinion gear mechanism for allowing the piston to slide according to the feeding direction.

The time during which the piston moves from the top dead center to the bottom dead center may be ten times or more the time during which the piston moves from the bottom dead center to the top dead center.

According to these configurations, it is possible to more reliably remove water droplets on the lens even in the case of the pump having a small volume and a small power.

Further, the foreign matter removal device according to another example of the present invention removes foreign matters on a lens of a camera, the foreign matter removal device including:

a single-cylinder type reciprocating pump for generating high-pressure air; and a nozzle for injecting the high-pressure air toward the lens, in which a volume of an internal space of the pump is 10 $cm^3$ or less, and the exhaust time per cycle required for exhausting the air in the internal space is 0.03 s or less.

According to the above configuration, the air in the pump having a small volume of 10 $cm^3$ or less can be instantaneously exhausted, and water droplets on the surface of the lens can be appropriately moved without causing an increase in the volume of the pump, so that it is possible to achieve the compatibility between the maintaining of the foreign matter removal performance and the size reduction of the device.

Further, the foreign matter removal device according to the present invention removes foreign matters adhering to a partition wall interposed between an in-vehicle sensor and a measuring target of the in-vehicle sensor, the foreign matter removal device including a single-cylinder type reciprocating pump for generating high-pressure air; and a nozzle for injecting the high-pressure air toward the partition wall, in which a volume of an internal space of the pump is 10 $cm^3$ or less, and the exhaust time per cycle required for exhausting the air in the internal space is 0.03 s or less.

The foreign matter removal device according to the present invention removes foreign matters on a lens of an in-vehicle camera attached to a vehicle so that the lens of the in-vehicle camera is exposed toward the outside of a body panel of the vehicle, the foreign matter removal device including:

a generation unit for generating high-pressure air;

a nozzle for injecting the high-pressure air toward the in-vehicle camera; and a piping connecting the generation unit and the nozzle, in which the piping has a function of preventing the reverse flow of water.

According to the above configuration, the piping has the function of preventing the reverse flow of water. Therefore, even when water or the like is introduced from the tip end of the nozzle at the time of generating high-pressure air by the generation unit, it is possible to prevent the water from entering into the generation unit. As a result, it is possible to maintain the performance of removing foreign matters without causing the failure or breakage of the generation unit.

A volume of an internal space of the piping may be larger than a volume of an internal space of the generation unit.

The generation unit may be constituted by a pump using a piston, and the volume of the internal space of the piping may be larger than the volume of the internal space of the pump.

According to these configurations, the volume of the internal space of the piping is larger than the volume of the internal space of the generation unit that, for example, is a pump. Therefore, it is possible to reliably prevent the reverse flow of water or the like.

The generation unit may be arranged above the nozzle in the upper and lower direction of the vehicle.

According to the above configuration, it is possible to more reliably prevent the reverse flow of water or the like.

The piping may have an intermediate portion which is located below one end portion connected to the generation unit and the other end portion connected to the nozzle in the upper and lower direction of the vehicle.

According to the above configuration, it is possible to more reliably prevent water or the like from entering the generation unit.

Further, the foreign matter removal device according to another example of the present invention removes foreign matters on a lens of a camera, the foreign matter removal device including:

a generation unit for generating high-pressure air;

a nozzle for injecting the high-pressure air toward the lens; and a piping connecting the generation unit and the nozzle, in which the piping has a function of preventing the reverse flow of water.

According to the above configuration, the piping has the function of preventing the reverse flow of water. Therefore, even when water or the like is introduced from the tip end of the nozzle at the time of generating high-pressure air by the generation unit, it is possible to prevent the water from entering into the generation unit. As a result, it is possible to maintain the performance of removing foreign matters without causing the failure or breakage of the generation unit.

Further, the foreign matter removal device according to the present invention removes foreign matters adhering to a partition wall interposed between an in-vehicle sensor and a measuring target of the in-vehicle sensor, the foreign matter removal device including a generation unit for generating high-pressure air;

a nozzle for injecting the high-pressure air toward the partition wall; and a piping connecting the generation unit and the nozzle, in which the piping has a function of preventing the reverse flow of water.

Further, the vehicle of the present invention includes the foreign matter removal device described above.

For example, even when a lens of an in-vehicle camera becomes dirty due to rain, mud or the like, foreign matters on the lens can be removed by blowing compressed air thereto, thereby enhancing the accuracy of information obtained from the in-vehicle camera.

Effects of Invention

According to the present invention, it is possible to provide a foreign matter removal device which is capable of achieving the size reduction and simplification of the structure while maintaining the performance of removing foreign matters and preventing the reverse flow of water or the like, and a vehicle provided with the foreign matter removal device.

BRIEF DESCRIPTION OF DRAWINGS

FIG. 4 is a configuration view of a high-pressure air generation unit included in the foreign matter removal device.

EMBODIMENT FOR CARRYING OUT INVENTION

Hereinafter, an example of an embodiment of the present invention will be described in detail with reference to the drawings.

A foreign matter removal device of the present invention is applied as a device for removing foreign matters such as water droplets, mud and dust adhering to a lens of an in-vehicle camera, for example.

Figure 1A:
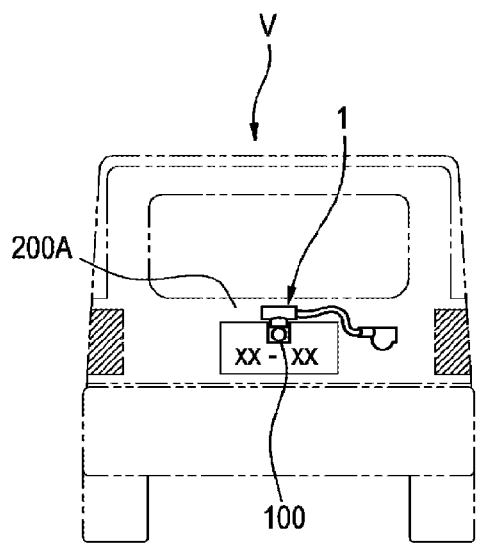
FIG. 1A is a rear view (a foreign matter removal device is shown in a perspective view) of a vehicle.
Figure 1B:
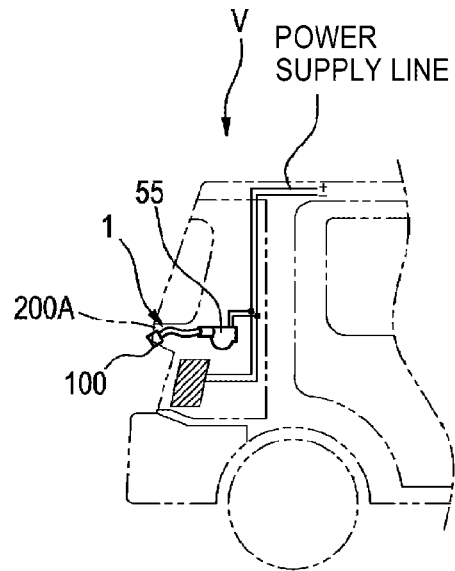
FIG. 1B is a side view (the foreign matter removal device is shown in a perspective view) of a rear part of the vehicle.

As shown in FIGS. 1A and 1B, a foreign matter removal device 1 is attached to a back door 200A of a vehicle V, for example. The foreign matter removal device 1 is provided with a drive unit 55, and a power supply terminal of the drive unit 55 is connected to a power supply line of a vehicle. For example, with the triggering that a gear of the vehicle V has entered the reverse, a vehicle control unit (ECU; not shown) causes an in-vehicle camera 100 (to be described later) to start photographing, and the foreign matter removal device 1 is controlled to operate by the vehicle control unit (ECU) within several seconds at the start of photographing, for example.

Figure 1C:
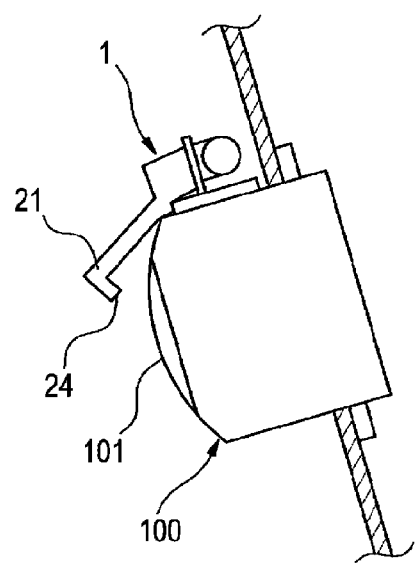
FIG. 1C is a partial enlarged view of the rear part of the vehicle.

The in-vehicle camera 100 is a camera for confirming, for example, the rear side of the vehicle V and, as shown in FIG. 1C, a lens 101 of the in-vehicle camera 100 is attached to the back door 200A so that it is exposed toward the outside of the back door 200A of the vehicle V. The in-vehicle camera 100 is provided with an imaging unit (not shown), and the lens 101 covers the imaging unit. As the lens 101, a simple translucent cover that does not converge or diffuse light is also included in the lens of this example.

Figure 2A:
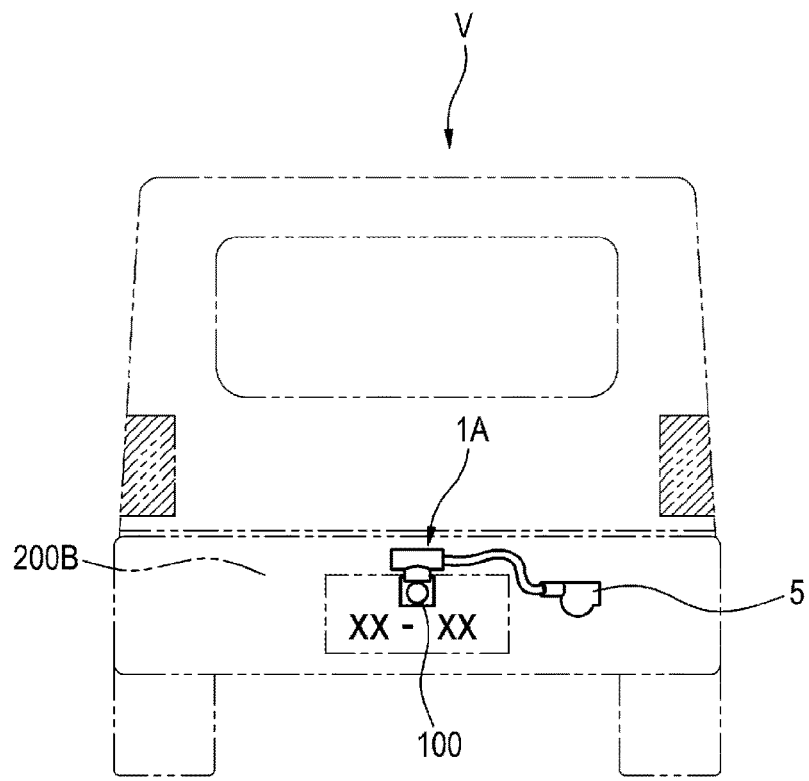
FIGS. 2A and 2B are views showing another example of a position where the foreign matter removal device is attached.
Figure 2B:
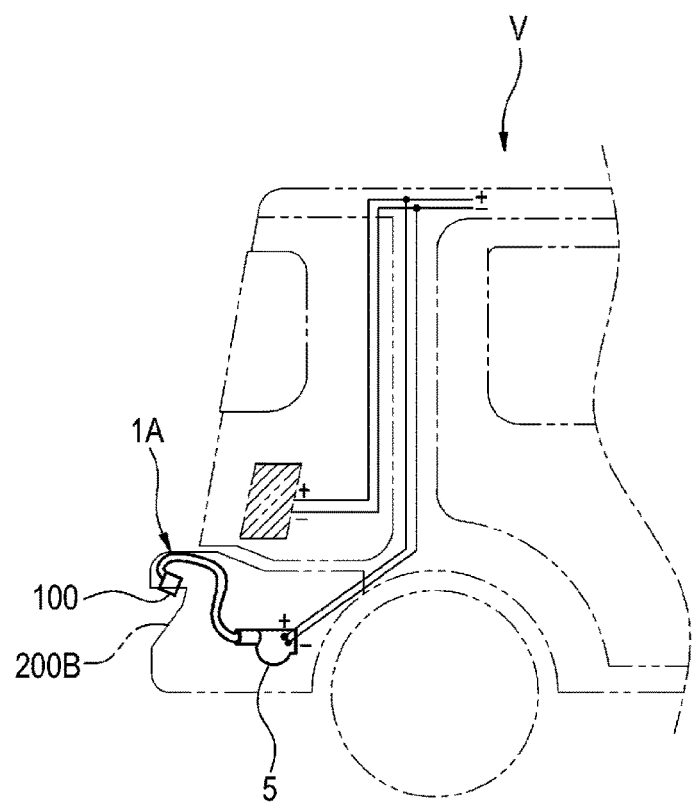

Meanwhile, as shown in FIGS. 2A and 2B, a foreign matter removal device 1A may be attached to a rear bumper 200B of the vehicle V, for example. Meanwhile, the position at Which the in-vehicle camera 100 is attached is not limited to the rear end side of the vehicle but may be a body panel such as the front side or lateral side of the vehicle. Further, the in-vehicle camera 100 may be attached to a vehicle body via a vehicle mounted component such as a lamp, a door knob, a mirror, a bumper attached to the body panel, or the in-vehicle camera 100 may be mounted as a part (as an integral body) of these components.

Figure 3:
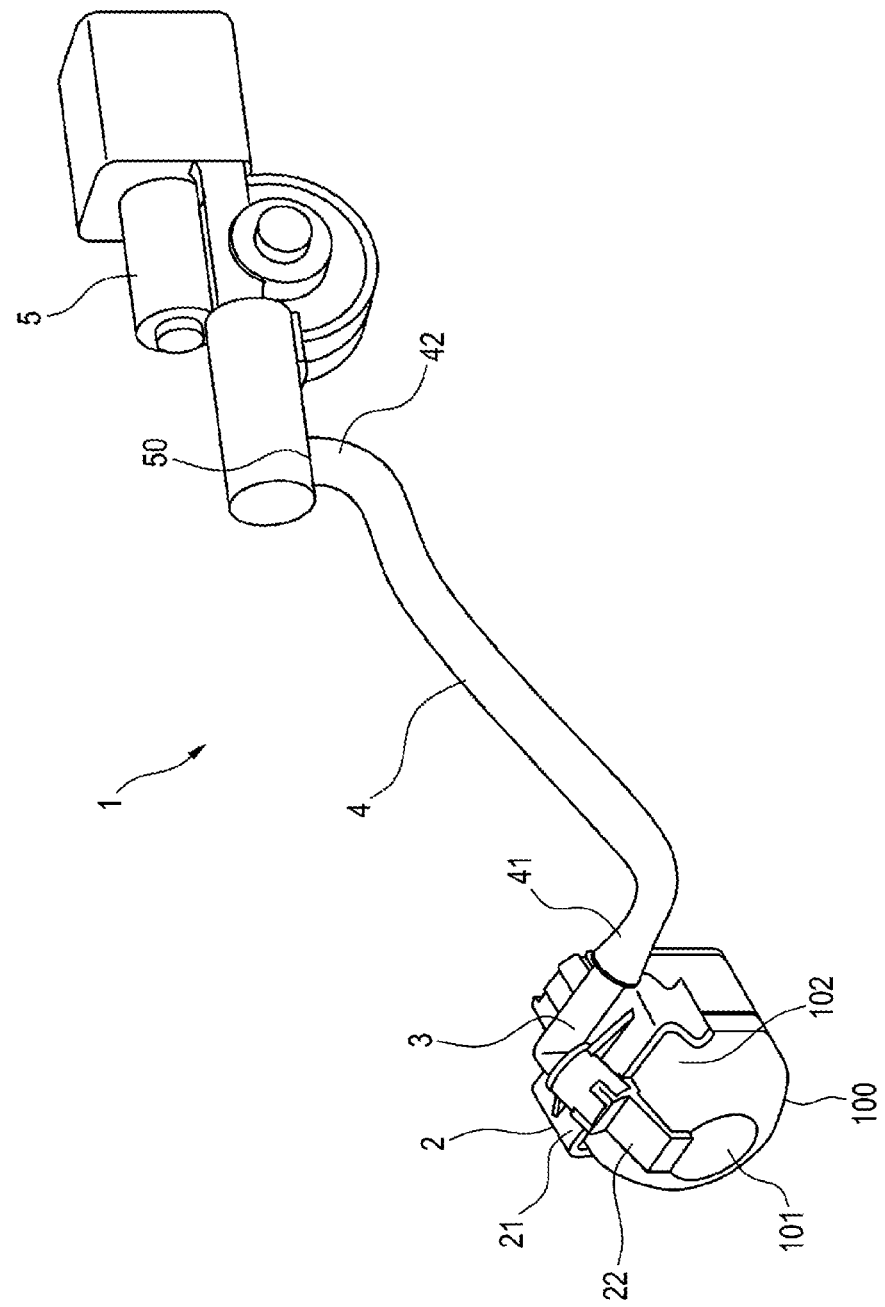
FIG. 3 is a perspective view of a foreign matter removal device according to an embodiment of the present invention.

As shown in FIG. 3, the foreign matter removal device 1 includes a nozzle unit 2, a joint member 3, a hose 4, and a high-pressure air generation unit 5.

The nozzle unit 2 is configured to be removably attached to the in-vehicle camera 100. The nozzle unit 2 includes an attachment part 21 and a nozzle 22. The nozzle unit 2 is formed of resin material, for example.

The attachment part 21 is attached to a housing 102 of the in-vehicle camera 100 so as to cover a top surface of the in-vehicle camera 100. The nozzle 22 injects high-pressure air toward a lens 101 of the in-vehicle camera 100. The nozzle 22 is formed integrally with the attachment part 21. The nozzle 22 is provided in such a way that an ejection port of the nozzle 22 faces the lens 101 when the attachment part 21 is attached to the housing 102. Here, the phrase, "formed integrally with," means that an operator can handle the nozzle 22 and the attachment part 21 as an integral part during assembly work. Specifically, for example, the nozzle 22 and the attachment part 21 may be molded of the same material and in the same mold. Alternatively, the nozzle 22 and the attachment part 21 may be respectively molded of separate materials, and then, fitted together and formed integrally, thereby constituting the nozzle unit 2.

The joint member 3 is a member for joining the nozzle 22 of the nozzle unit 2 and the hose 4. One end portion of the joint member 3 is connected to the nozzle 22 and the opposite end portion thereof is connected to the hose 4. The joint member 3 is formed of resin material, for example.

The hose 4 is a piping member that connects, together with the joint member 3, the nozzle 22 and a high-pressure air generation unit 5. One end portion of the hose 4 is connected to the joint member 3 and the opposite end portion thereof is connected to a discharge port 50 of the high-pressure air generation unit 5. The hose 4 is formed of, for example, a material such as resin or rubber.

The high-pressure air generation unit 5 is a unit for generating high-pressure air to be fed to the nozzle 22, and is, for example, a single-cylinder type reciprocating pump. The high-pressure air generation unit 5 is attached to a part of a vehicle body at the inside of a vehicle.

As shown in FIG. 4, the high-pressure air generation unit 5 includes a case body 51 and a moving mechanism disposed inside the case body 51. Of a moving direction of a piston 52 in the high-pressure air generation unit 5, a rearward direction that is a direction of feeding out air refers to a feeding direction, and a forward direction that is opposite to the feeding direction refers to a force accumulation direction.

The high-pressure air generation unit 5 includes a piston 52 for feeding out high-pressure air, an urging spring 58 for urging the piston 52 in a feeding direction of the high-pressure air, and a rack-and-pinion gear mechanism for allowing the piston 52 to slide according to the feeding direction of the high-pressure air. In an initial state before high-pressure air is fed out, the piston 52 is positioned on the feeding direction side by an urging force of the urging spring 58, and a rack 53 is positioned in a state where a rack portion 53a is engageable with a gear portion 54a of a pinion 54.

When the driving of the motor (drive unit) 55 is started and a driving force of the motor 55 is transmitted to a worm wheel 57 via a worm 56, the gear portion 54a of the pinion 54 is meshed with the rack portion 53a of the rack 53. Therefore, the rack 53 moves in the force accumulation direction against an urging force of an urging spring 58 in accordance with the rotation of the pinion 54. As the rack 53 moves in the force accumulation direction, the meshing between the gear portion 54a and the rack portion 53a is released at a predetermined position. The position (position shown in FIG. 4) where the meshing between the gear portion 54a and the rack portion 53a is released is set as the bottom dead center of the piston 52. In a state in which the piston 52 is positioned at the bottom dead center, the air (outside air) flowing into a substantially front half portion (second space) 60b of an internal space 60 of a piston support portion 59 passes through a gap 61b along a step 61a and flows toward a substantially rear half portion (first space) 60a of the internal space 60.

When the piston 52 is moved to the bottom dead center, the meshing between the gear portion 54a and the rack portion 53a is released, and the piston 52 is moved in the feeding direction at a speed higher than the moving speed in the force accumulation direction by an urging force of the urging spring 58. Meanwhile, the position where an end portion 52A of the piston 52 is moved to an imaginary line L of the first space 60a is defined as the top dead center. In this way, the air flowing from the second space 60b to the first space 60a passes through the discharge port 50 of a connection protrusion 62 from the first space 60a and is fed toward the nozzle 22 of the nozzle unit 2 via the hose 4. At this time, since the diameter of the discharge port 50 is smaller than that of the piston support portion 59, the air discharged from the first space 60a through the discharge port 50 is compressed into high-pressure air and is fed out.

In the present embodiment, a volume Vo of the internal space 60 of the piston support portion 59 of the high-pressure air generation unit 5 is 10 cm$^3$ or less. The volume Vo is a volume of the first space 60a in a state in which the piston 52 is positioned at the bottom dead center (see FIG. 4).

Figure 5A:
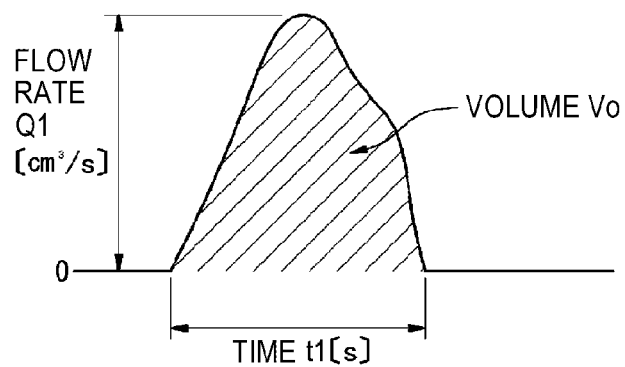
FIGS. 5A to 5C are image views of a flow rate-time curve of high-pressure air generated by the high-pressure air generation unit and exhausted toward a nozzle.
Figure 5B:
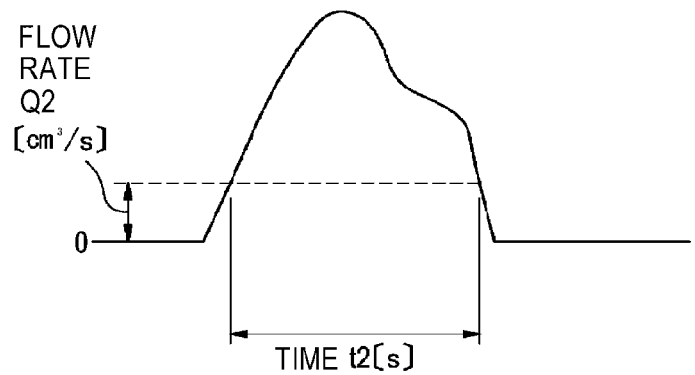
Figure 5C:
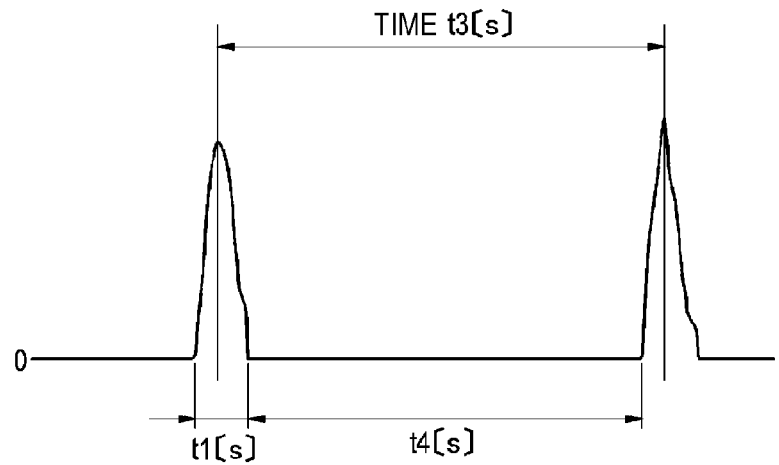

FIGS. 5A to 5C are image views of a flow rate-time curve of high-pressure air generated by the high-pressure air generation unit 5 and exhausted from a tip end of the nozzle 22 toward the lens 101 of the in-vehicle camera 100.

As shown in FIG. 5A, the high-pressure air generated by the high-pressure air generation unit 5 flows into the nozzle 22 and is exhausted from a tip end of the nozzle 22 toward the lens 101 of the in-vehicle camera 100. At this time, the maximum flow rate is represented as Q1 (cm$^3$/s), and the time required for every exhaust is represented as t1(s). As a result of intensive study by the inventors, it has been found that the exhaust time t1(s) per cycle of the air in the first space 60a is desirably set to 0.03 seconds or less in order to remove water droplets adhering on the lens 101 of the in-vehicle camera 100 by using the small high-pressure air generation unit 5 (single-cylinder type reciprocating pump) in which the volume Vo of the internal space 60 of the piston support portion 59 is 10 cm$^3$ or less. When the exhaust time t1(s) per cycle is longer than 0.03 seconds, it is difficult to sufficiently secure the flow velocity or maximum flow rate Q1 of the high-pressure air, and therefore, it is difficult to properly blow away water droplets adhering on the lens 101. Further, the maximum flow rate Q1 in the exhaust per cycle is preferably 100 cm$^3$/s or more, more preferably 150 cm$^3$/s or more. By setting the maximum flow rate Q1 to 100 cm$^3$/s or more, it is possible to reliably remove water droplets or the like on the lens 101. Meanwhile, in FIG. 5A, the amount of air exhausted at the maximum flow rate Q1 within the exhaust time t1 per cycle corresponds to the volume Vo of the first space 60a of the piston support portion 59.

Further, as shown in FIG. 5B, during a predetermined time t2(s) of the exhaust time t1(s) per cycle, it is preferable that high-pressure air is discarded so as to maintain a predetermined flow rate Q2 (cm$^3$/s). Specifically, during at least 0.02 seconds (time t2) of the exhaust time t1 per cycle, it is preferable to exhaust the high-pressure air so that the flow rate Q2 of the high-pressure air becomes 50 cm$^3$/s or more. The reason is that, in order to remove water droplets, it is preferable to perform the exhaust for a certain time in a region where the flow rate of the high-pressure air generation unit 5 is somewhat high.

The high-pressure air generation unit 5 is controlled so as to repeatedly exhaust the high-pressure air. Preferably, the exhausting of the high-pressure air from the high-pressure air generation unit 5 is performed at least once per one second. For example, as shown in FIG. 5C, the exhaust interval t3(s) of the high-pressure air is set as the time between the timings when the maximum flow rate of each exhaust time t1 is reached. By evacuating the high-pressure air generation unit 5 a plurality of times in a short cycle, it is possible to quickly remove water droplets newly adhering to the surface of the lens 101 after removing water droplets.

In FIG. 5C, the time during which the piston 52 in the high-pressure air generation unit 5 moves from the top dead center (a state in which the end portion 52A is located at the imaginary line L of the first space 60a) to the bottom dead center (a state shown in FIG. 4) is defined as a force accumulation time t4(s), and the time during which the piston 52 moves from the bottom dead center to the top dead center is defined as an exhaust time (feeding time) t1. At this time, as shown in FIG. 5C, it is preferable that the force accumulation time t4 is ten times or more the feeding time t1. In this way, by slowly moving the piston 52 from the top dead center to the bottom dead center while instantaneously moving the piston 52 from the bottom dead center to the top dead center, that is, by instantaneously exhausting the air within the feeding time t1 while securing the force accumulation time t4 which is sufficiently longer than the feeding time t1, it is possible to reliably move water droplets adhering to the lens 101 even in the high-pressure air generation unit 5 where an urging force of the urging spring 58 is small.

Figure 6A:
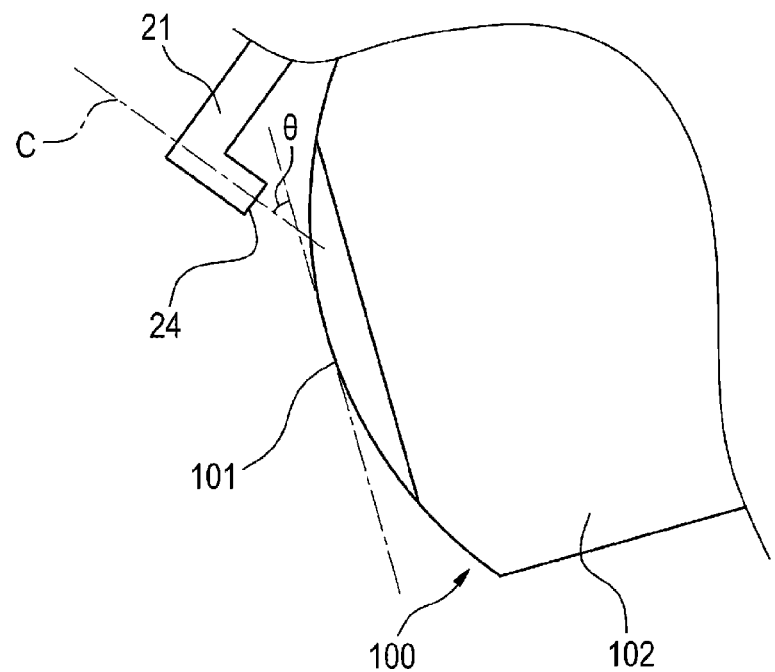
FIGS. 6A and 6B are schematic configuration views showing a positional relationship between the nozzle included in the foreign matter removal device and a lens of an in-vehicle camera.

As described above, the nozzle unit 2 is configured to be removably attached to the in-vehicle camera 100. However, as shown in FIG. 6A, when an angle formed by a line C passing through the center of the ejecting port 24 of the nozzle 22 and a tangential line of the apex of the lens 101 is defined as θ, the nozzle 22 is positioned with respect to the lens 101 so that the angle θ is 0° or more but 60° or less. Preferably, the angle θ is 5° or more but 30° or less. In this way, by arranging the ejecting port 24 of the nozzle 22 with respect to the lens 101 while maintaining a predetermined slope, the high-pressure air can be easily blown onto the entire surface of the lens 101, thereby enhancing the performance of removing water droplets. Meanwhile, in the case where the lens mounted on the in-vehicle camera is a planar lens (e.g., plano-concave lens) instead of the curved lens 101 as in the present embodiment, a line along the surface of the planar lens is considered as the above tangential line, and the nozzle 22 may be positioned with respect to the planar lens so that the angle θ formed by the surface of the lens and the center line C of the ejecting port 24 of the nozzle 22 is 0° or more but 60° or less.

Figure 6B:
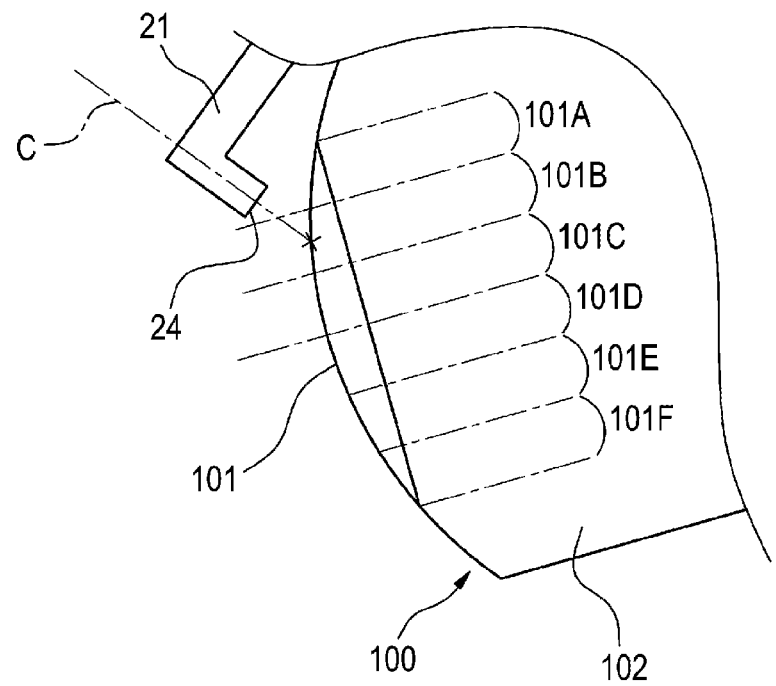

Further, as shown in FIG. 6B, when the lens 101 is divided into six equal parts in the upper and lower direction, and a first region 101A, a second region 101B, a third region 101C, a fourth region 101D, a fifth region 101E and a sixth region 101F from the upper are defined, the center line C of the ejecting port 24 of the nozzle 22 intersects with the second region 101B which is the second portion from the top of the lens 101. In this way, by positioning the ejecting port 24 of the nozzle 22 toward a certain region (second region 101B) on the upper side of the lens 101, the high-pressure air can be easily blown onto the entire surface of the lens 101, thereby enhancing the performance of removing water droplets.

Next, an operation of the foreign matter removal device 1 will be described with reference to FIGS. 3 and 4 again.

When the driving of the motor 55 in the high-pressure air generation unit 5 is started, first, air (outside air) for generating high-pressure air is sucked. The air is sucked into the high-pressure air generation unit 5 from the ejecting port 24 of the nozzle 22. The sucked air is fed out, as high-pressure air, from the discharge port 50 of the high-pressure air generation unit 5 to the hose 4 by piston motion due to an urging force of the urging spring 58. The high-pressure air is fed from the hose 4 to the nozzle 22 of the nozzle unit 2 through the joint member 3.

The high-pressure air flows into the nozzle 22, is injected from the ejecting port 24 of the nozzle 22 and is blown toward the lens 101 of the in-vehicle camera 100 at a predetermined angle. The high-pressure air ejected from the ejecting port 24 is blown toward the lens 101 of the in-vehicle camera 100. In this way, foreign matters adhering to the lens 101 are blown away, so that the dirt of the lens 101 is eliminated.

EXAMPLE 1

Figure 7:
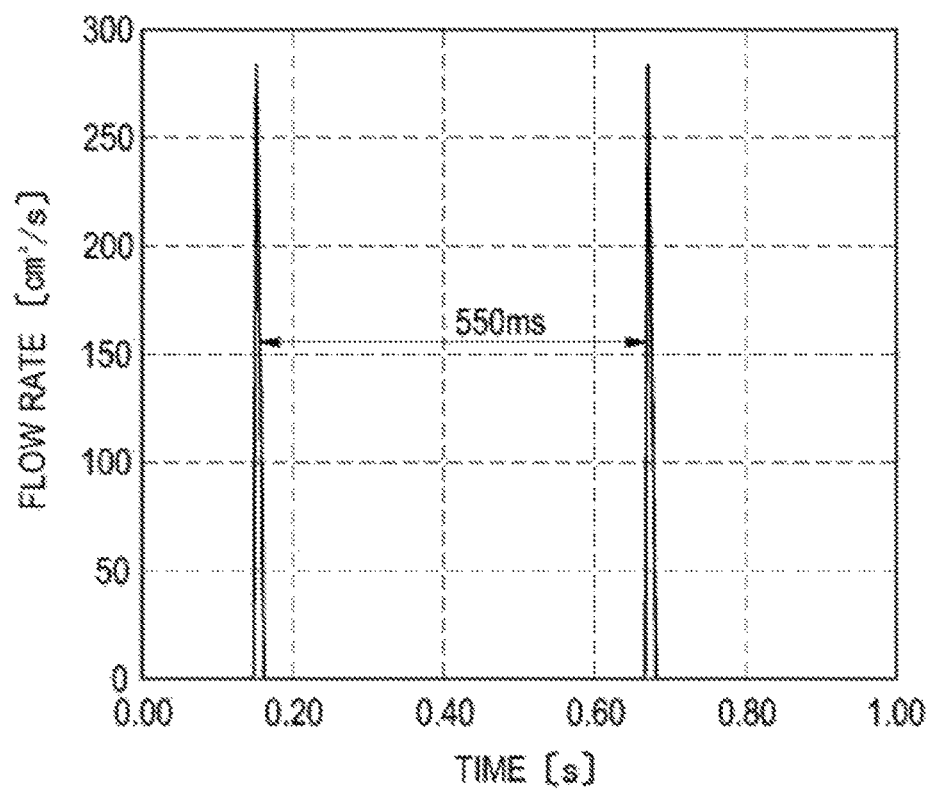
FIG. 7 is a flow rate-time graph according to Example 1 of high-pressure air exhausted from the high-pressure air generation unit.
Figure 8:
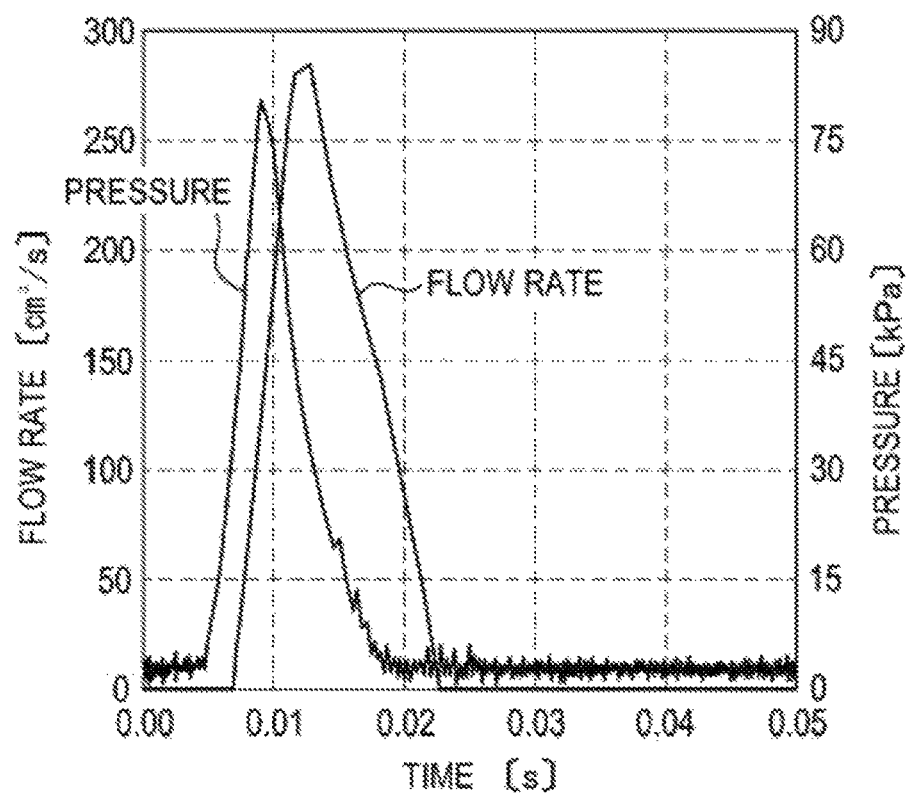
FIG. 8 is a flow rate-pressure-time graph according to Example 1.

FIG. 7 is a flow rate-time graph according to Example 1 of high-pressure air exhausted from the high-pressure air generation unit, and FIG. 8 is a flow rate-pressure-time graph according to Example 1. In Example 1, the high-pressure air generation unit having a volume Vo of 10 cm$^3$ or less is used, and the nozzle having a tip end opening with a diameter of φ1.2 mm is used.

As shown in FIGS. 7 and 8, in Example 1, the exhaust time per cycle is about 10 ms (0.01 s), the maximum flow rate is about 275 cm$^3$/s, and the exhaust interval is 550 ms. Further, the maximum pressure during the exhaust is about 80 kPa.

It was confirmed that water adhering on the lens can be appropriately removed by evacuating the nozzle at the flow rate, the exhaust time, and the exhaust interval shown in the flow rate-time graph of Example 1.

EXAMPLE 2

Figure 9:
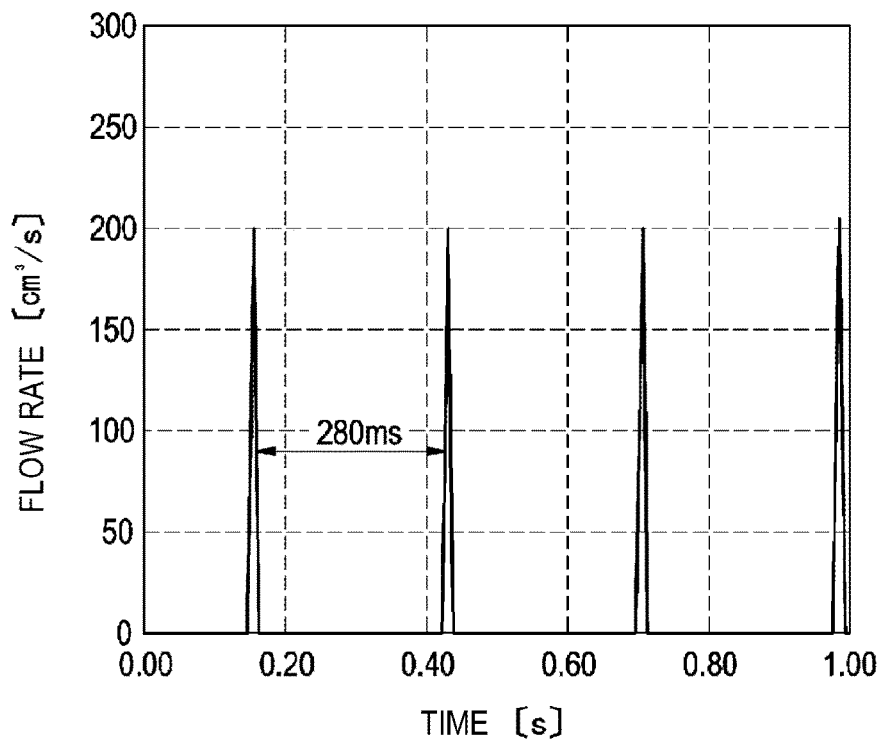
FIG. 9 is a flow rate-time graph according to Example 2 of high-pressure air exhausted from the high-pressure air generation unit.

FIG. 9 is a flow rate-time graph according to Example 2 of high-pressure air exhausted from the high-pressure air generation unit. Also in Example 2, similar to Example 1, the high-pressure air generation unit having a volume Vo of 10 cm$^3$ or less is used, and the nozzle having a tip end opening with a diameter of φ1.2 mm is used.

As shown in FIG. 9, in Example 2, the exhaust time per cycle is about 10 ms (0.01 s) similar to Example 1, but the maximum flow rate is about 200 cm$^3$/s and the exhaust interval is 280 ms.

It was confirmed that water adhering on the lens can be appropriately removed by evacuating the nozzle at the flow rate, the exhaust time, and the exhaust interval shown in the flow rate-time graph of Example 2. Further, it can be confirmed that, by making the exhaust interval of Example 2 shorter than Example 1, i.e., performing the exhaust more frequently, the performance of removing foreign matters can be maintained even when the maximum flow rate per cycle is suppressed lower than in Example 1.

Meanwhile, the necessary flow rate Q at the exhaust time t1 per cycle is obtained as follows.

For example, in an in-vehicle camera having a lens with a predetermined outer diameter (e.g., 15 mm), assuming that the total amount of water droplets adhering to the surface of the lens is 3 cm$^3$, the kinetic energy F for moving water of 3 cm$^3$ on the lens by 15 mm is obtained by the following equation (1).

[Equation 1]

$$F = \mu N \times L = 0.3 \times 3(g) \times 15(mm) = 0.135 \text{ mJ} \qquad (1)$$

Here, μ (coefficient of friction) is set to 0.3.

On the other hand, the energy W of air (wind) injected from the nozzle toward the lens is obtained by the following equation (2).

[Equation 2]

$$W = \frac{1}{2}\rho A V_3 \qquad (2)$$

$$\begin{cases} \rho: \text{ air density} = 1.293 \text{ kg/m}^3 \\ A: \text{ operating area} = \text{opening area of opening portion of nozzle} \\ V: \text{ wind velocity} \end{cases}$$

Here, A (the opening area of the ejecting portion of the nozzle) is set to 7.5 mm$^2$.

From the kinetic energy F obtained by the equation (1) and the energy W of the air (wind) obtained by the equation (2), a wind velocity V for moving water of 3 cm$^3$ on the lens by 15 mm is obtained by the following equation (3). Meanwhile, at this time, the unit time t is 0.01 s.

[Equation 3]

$$(0.135 \times 10^{-3})/t = (1/2) \times 1.293 \cdot (7.5 \times 10^{-8}) \times V^3 \qquad (3)$$

$$(0.135 \times 10^{-3})/t = (4.85 \times 10^{-2}) \cdot V^2$$

$$27.83/t = V^2 t \text{ is set to } 0.01$$

$$2783 = V^2$$

$$V = 14 (m/s)$$

Based on the wind velocity W obtained by the equation (3), the flow rate Q required for the high-pressure air generation unit is obtained by the following equation (4).

[Equation 4]

$$Q = V \cdot A = 14 \text{ (m/s)} \cdot (7.5 \times 10^{-6} (m^3)) \qquad (4)$$

$$= 0.105 \times 10^{-6} (m^3/s)$$

$$= 105 \text{ (cc/s)}$$

In this way, by appropriately setting the surface area of the lens, the total amount of water droplets adhering to the lens, the opening area of the nozzle, and the unit time or the like, the flow rate Q required for the high-pressure air generation unit 5 in order to appropriately remove water droplets or the like adhering to the surface of the lens can be obtained. In the present embodiment, as a result of intensive study by the inventors based on the necessary flow rate Q of the high-pressure air generation unit 5, a preferable range of the exhaust time t1, the exhaust interval t3 and the minimum required flow rate Q2 or the like has been found in order to achieve the compatibility between the size reduction of the high-pressure air generation unit 5 and the foreign matter removal performance.

REFERENCE EXAMPLE

Figure 10:
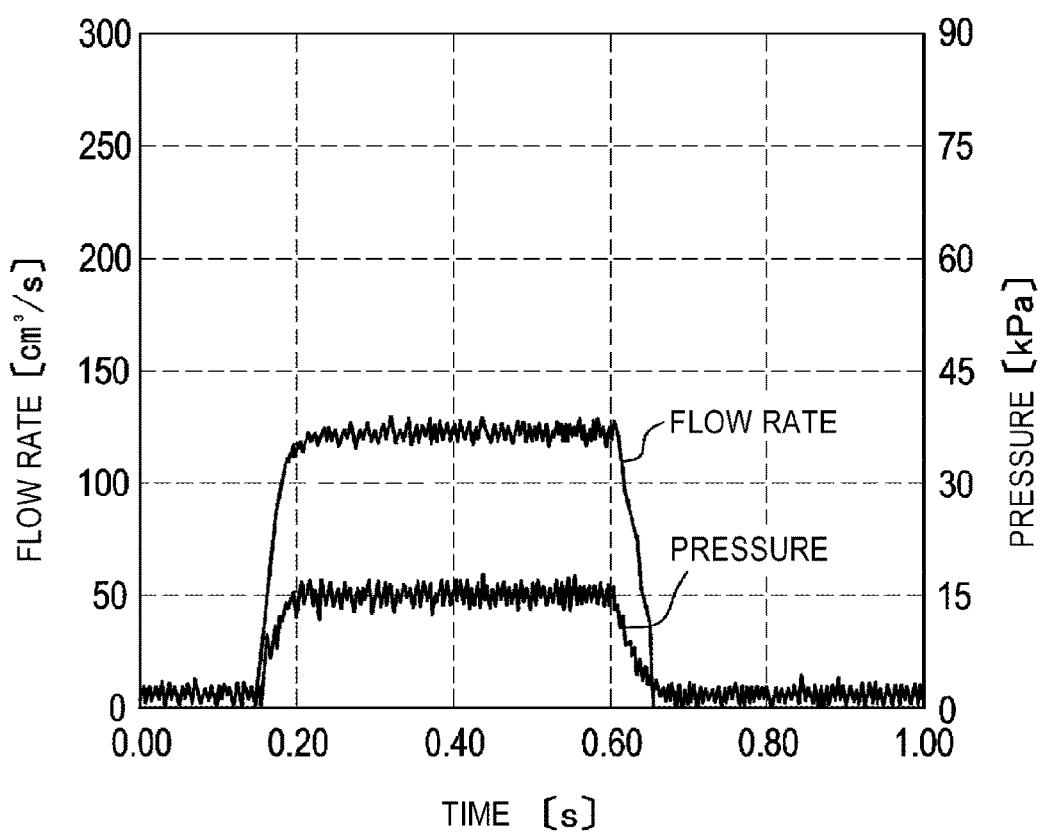
FIG. 10 is a flow rate-pressure-time graph of air exhausted from a pump according to a reference example.

FIG. 10 is a flow rate-pressure-time graph of high-pressure air exhausted from a high-pressure air generation unit according to a reference example. In the reference example, similar to Example 1, the nozzle having a tip end opening with a diameter of φ1.2 mm is used.

In the reference example, the exhaust time per cycle is about 200 ms (0.2 s), the maximum flow rate is about 125 cm$^3$/s, and the pressure during the exhaust is about 50 kPa. As shown in the reference example, conventionally the exhaust time per cycle is lengthened in order to remove water adhering on the lens, and the exhaust is performed at a relatively small flow rate. In this case, it is necessary to increase the volume of the high-pressure air generation unit (e.g., single-cylinder type reciprocating pump), and space saving cannot be achieved.

On the contrary, according to the foreign matter removal device 1 of the present embodiment, the high-pressure air generation unit 5 in which the volume Vo of the internal space (first space) 60*a* is 10 cm$^3$ or less is used, and the high-pressure air is injected so that the exhaust time t1 per cycle required for exhausting the air in the internal space 60*a* is 0.03 s or less. In this way in the present embodiment, the air in the high-pressure air generation unit 5 having a small volume of 10 cm$^3$ or less is adapted to be instantaneously exhausted, and water droplets on the surface of the lens 101 can be appropriately moved without causing an increase in the volume Vo of the high-pressure air generation unit 5, so that it is possible to achieve the compatibility between the maintaining of the foreign matter removal performance and the size reduction of the device.

Further, according to the present embodiment, the exhaust form the high-pressure air generation unit is set so that the air flow rate Q2 is maintained at 50 cm$^3$/s or more during 0.02 s of the exhaust time t1. In this way, since the high-pressure air generation unit 5 is driven so as to maintain a high flow rate region for a certain period of time, water droplets can be more reliably removed.

Further, according to the present embodiment, the exhaust from the high-pressure air generation unit 5 is performed a plurality of times in a short cycle of at least one per second. Therefore, for example, it is possible to quickly remove water droplets newly adhering to the surface of the lens 101 after removing water droplets without giving any discomfort to a driver.

Further, the foreign matter removal device of the present embodiment is configured such that the angle θ formed by the line C passing through the center of the ejecting port 24 of the nozzle 22 and the tangential line of the apex of the lens 101 is 0° or more but 60° or less, and, the center line C of the ejecting port 24 of the nozzle 22 intersects with the second region 101B which is the second portion from the top of the lens 101 when the lens 101 is divided into six equal parts in the upper and lower direction. Furthermore, the time (force accumulation time) t4 when the piston 52 in the high-pressure air generation unit 5 is at the bottom dead center is ten times or more the time (exhaust time) t1 when the piston 52 is at the top dead center. With these configurations, it is possible to more reliably remove water droplets on the lens 101 even when the high-pressure air generation unit 5 having a small volume and a small power is used.

Figure 11:
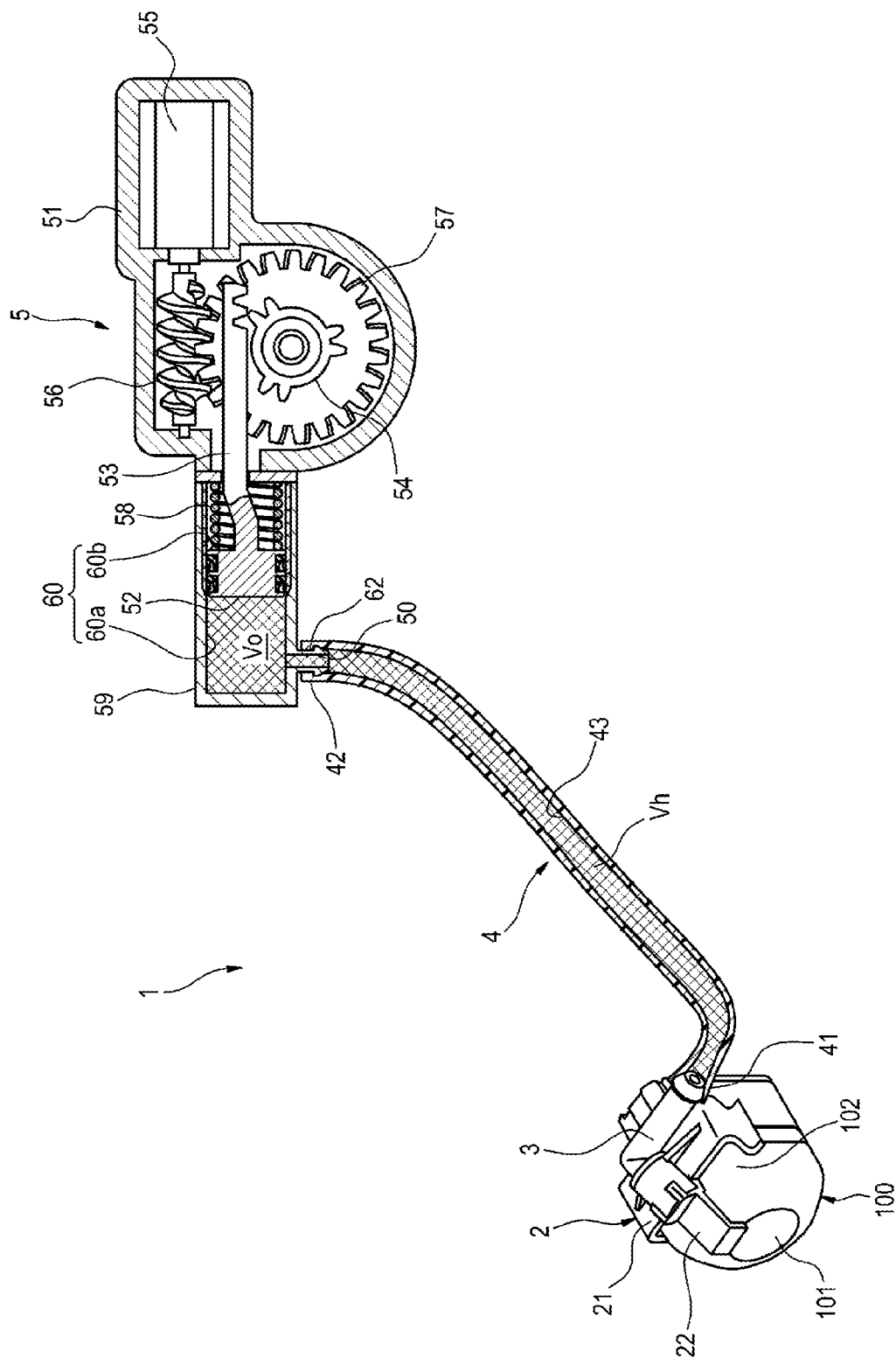
FIG. 11 is a partial sectional view as seen from the side of the foreign matter removal device.

FIG. 11 is a partial sectional view as seen from the side of the foreign matter removal device 1.

As shown in FIG. 11, in the foreign matter removal device 1, the high-pressure air generation unit 5 and the in-vehicle camera 100 to which the nozzle unit 2 is attached are arranged such that the high-pressure air generation unit 5 is located above the nozzle unit 2 in the upper and lower direction of the vehicle body. Then, the shape of the piston support portion 59 and the diameter and length of the hose 4 are set such that a volume Vh of an internal space 43 of the hose 4 is larger than the volume Vo of the first space 60*a* of the piston support portion 59. Meanwhile, the volume Vo corresponds to the volume of the first space 60*a* in a state (see FIGS. 3 and 4) in which the piston 52 is located at the bottom dead center. In this way, the hose 4 connecting the high-pressure air generation unit 5 and the nozzle unit 2 (joint member 3) has a function of preventing the reverse flow of water.

By the way, when the driving of the drive motor in the high-pressure air generation unit 5 is started and air (outside air) for generating high-pressure air is sucked from the tip end of the nozzle 22, water or mud or the like may be introduced from the tip end of the nozzle 22, and these foreign matters may enter the high-pressure air generation unit 5. Therefore, conventionally, in addition to the hose (exhaust pipeline) connecting the nozzle and the high-pressure air generation unit that is an air pump, an intake pipeline is provided in the high-pressure air generation unit and a one way valve (check valve) is provided in each of the exhaust pipeline and the intake pipeline, thereby preventing water or the like from entering the high-pressure air generation unit 5.

On the contrary, in the present embodiment, the volume Vh of the internal space 43 of the hose 4 is larger than the volume Vo of the first space 60*a* of the piston support portion 59. Therefore, even when foreign matters such as water are introduced from the tip end of the nozzle 22 at the time of generating high-pressure air by the high-pressure air generation unit 5, it is possible to prevent foreign matters from entering into the piston support portion 59 of the high-pressure air generation unit 5. As a result, the desired high-pressure air can be generated without causing the failure or breakage of the high-pressure air generation unit 5, and can be injected from the nozzle 22 toward the lens 101. Further, since the high-pressure air generation unit 5 is located above the nozzle unit 2 in the upper and lower direction of the vehicle body, it is possible to more reliably prevent the reverse flow of water or the like, and it is possible to maintain the performance of removing foreign matters adhering to the lens 101 of the in-vehicle camera 100. Furthermore, an intake pipeline for intake is provided in the high-pressure air generation unit 5 and a water reverse flow prevention mechanism can be provided without mounting a new component such as a check valve on the hose 4 or the intake pipeline, for example. In this way the configuration of the foreign matter removal device 1 is very simple.

Next, modified examples of the foreign matter removal device 1 will be described with reference to FIGS. 2 and 12.

As described above, as shown in FIGS. 2A and 2B, the foreign matter removal device 1A may be attached to the rear bumper 200B of the vehicle V, for example. At this time, due to the structure of the vehicle, it may be necessary to arrange the high-pressure air generation unit 5 so as to be located on the lower side of the vehicle body than the in-vehicle camera 100 to which the nozzle unit 2 is attached.

Figure 12:
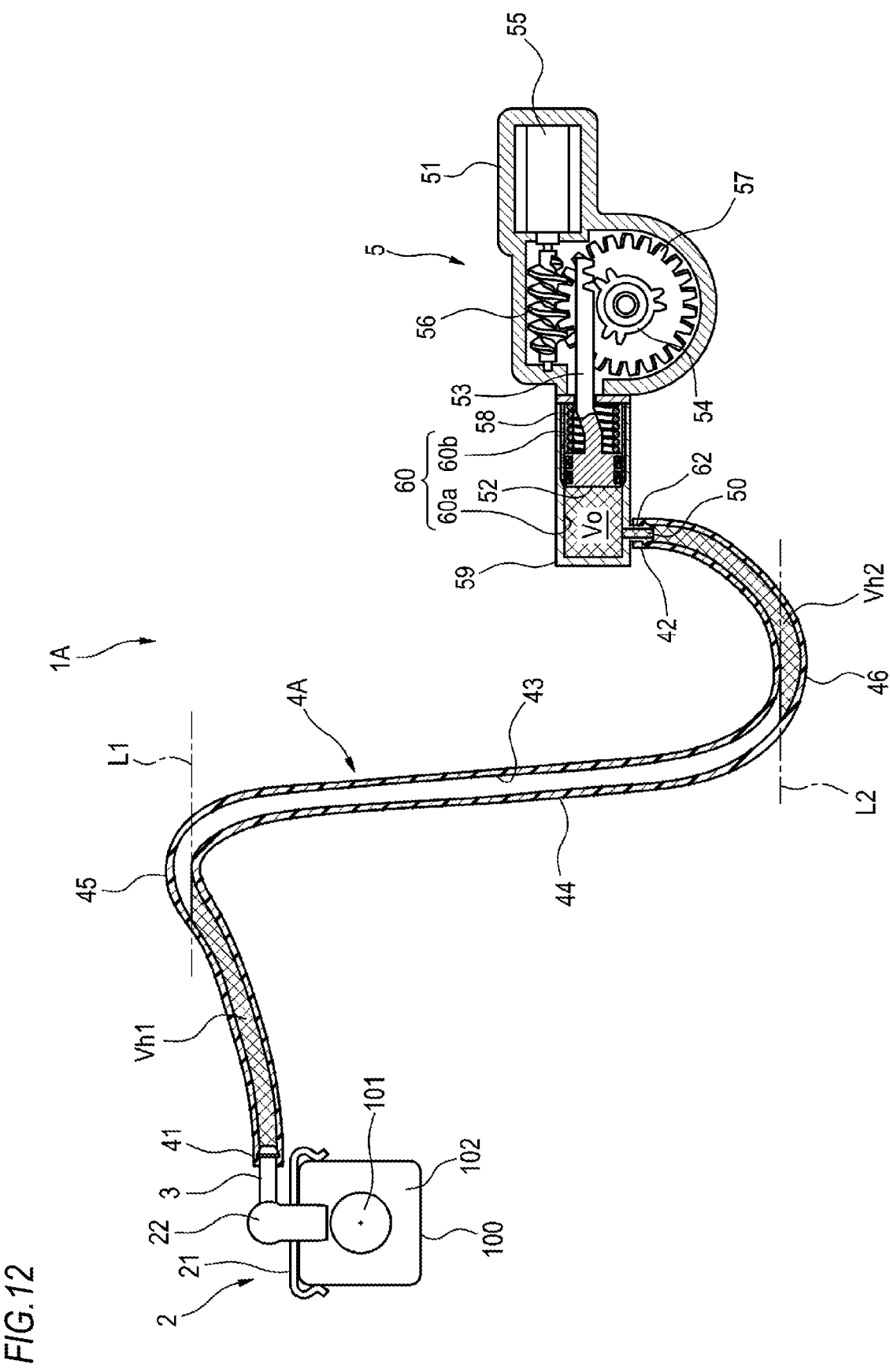
FIG. 12 is a partial sectional view as seen from the side of the foreign matter removal device shown in FIGS. 2A and 2B.

As shown in FIG. 12, a hose 4A of the foreign matter removal device 1A has an intermediate portion 44 which is located below a rear end portion 41 connected to the joint member 3 and a front end portion 42 connected to the high-pressure air generation unit 5 in the upper and lower direction of the vehicle. Further, from the rear end portion 41 connected to the joint member 3, the hose 4A is temporarily disposed on the upper side. And then, the hose 4A is bent in a substantially U shape, and the front end portion 42 is connected to the high-pressure air generation unit 5. That is, the hose 4A is composed of a mountain portion 45 and a valley portion 46.

In this way when the high-pressure air generation unit 5 is arranged at a position lower than the nozzle 22, the hose 4A secures a volume of the internal space 43 larger than the volume Vo of the first space 60a of the piston support portion 59 at a position higher than the nozzle 22. That is, in the foreign matter removal device 1A, a volume Vh1 of the internal space 43 from the rear end portion 41 of the hose 4A to an inflection point L1 where the hose 4A is inflected downward is set to be larger than the volume Vo of the first space 60a of the piston support portion 59. Therefore, even when the air in the hose 4A is sucked into the piston support portion 59 at the time of generating high-pressure air by the high-pressure air generation unit 5, it is possible to prevent the water flowing backward from the tip end of the nozzle 22 from flowing toward the high-pressure air generation unit 5 beyond the mountain portion 45 of the hose 4A. In this way it is possible to maintain the performance of the foreign matter removal device 1A.

Further, preferably the foreign matter removal device 1A is configured such that a volume Vh2 of the internal space 43 from an inflection point L2 where the hose 4A is inflected upward at the intermediate portion 44 of the hose 4A to the front end portion 42 connected to the high-pressure air generation unit 5 is larger than the volume Vo of the first space 60a of the piston support portion 59. According to this configuration, for example, even when water enters the valley portion 46 of the hose 4A from the nozzle 22, the water does not flow backward to the inside of the high-pressure air generation unit 5, and thus, it is possible to maintain the performance of the foreign matter removal device 1A.

Although the embodiments of the present invention have been illustratively described above, the present invention is not limited to these embodiments, and other configurations can be adopted as necessary.

In the above embodiments, the joint member 3 is provided as a member for joining the nozzle 22 of the nozzle unit 2 and the hose 4. However, in the case where there is no need to change the posture of the hose 4 with respect to the nozzle 22, the hose 4 may be directly attached to the nozzle 22 without providing the joint member 3.

Further, in the above-described examples, the application to the camera (not limited to visible light) has been described. However, the sensor to which the present invention is applied is not limited to this. The present invention may be applied to sensors attachable to vehicles, such as LIDAE (laser radar), millimeter wave radars, and ultrasonic sensors.

Further, the target portion from which the foreign matter removal device removes foreign matters is not limited to the lens of the camera. For example, the present invention can be applied to a foreign matter removal device for removing foreign matters adhering on "partition wall" which is defined as a concept including an optical lens of a sensor element, a cover for covering a front surface of an optical lens, a cover for covering a vehicle mounted component such as a lamp having a part serving as a communication window of a sensor, a mirror, a bumper, a grill and a door knob, and a vehicle window when a sensor is mounted in a vehicle compartment. Meanwhile, this partition wall is not limited to a transparent member (translucency), but may not be transparent in an ultrasonic sensor, a millimeter wave radar or the like.

For example, in the above embodiments, the application of the foreign matter removal device to the in-vehicle camera has been described. However, the object to which the present invention is applied is not limited as long as it is a camera used outdoors. For example, a camera mounted so as to be exposed to the outside of an airplane, a railroad, a ship, a robot, an outdoor installation object, a building and the like may be included.

The present application is based on Japanese Patent Application (Patent Application No. 2015-131789) filed on Jun. 30, 2015, and Japanese Patent Application (Patent Application No. 2015-131790) filed on Jun. 30, 2015, the contents of which are incorporated herein by reference.

The invention claimed is:

1. A foreign matter removal device, comprising:
   a single-cylinder type reciprocating pump configured to generate high-pressure air; and
   a nozzle configured to suck air therefrom into the single-cylinder type reciprocating pump and to inject the high-pressure air toward a lens, wherein
   a volume of an internal space of the pump is 10 $cm^3$ or less, and
   exhaust time per cycle required for exhausting the air in the internal space is 0.03 seconds or less,
   wherein flow rate of the pump is 50 $cm^3/s$ or more during 0.02 seconds of the exhaust time required.

2. The foreign matter removal device according to claim 1, wherein
   exhaust from the pump is performed at least once per second.

3. The foreign matter removal device according to claim 1, wherein
   an angle formed by a line passing through a center of an ejecting port of the nozzle and a tangential line of an apex of the lens is 0° or more but 60° or less.

4. The foreign matter removal device according to claim 1, wherein
   a line passing through a center of the ejecting port of the nozzle intersects with a second region from a top of the lens when the lens is divided into six equal parts in upper and lower direction.

5. The foreign matter removal device according to claim 1, wherein
   the pump includes:
      a piston configured to feed out the high-pressure air; and
      a spring configured to urge the piston in a feeding direction of the high-pressure air.

6. The foreign matter removal device according to claim 5, wherein
   the pump includes a rack-and-pinion gear mechanism configured to allow the piston to slide according to the feeding direction.

7. The foreign matter removal device according to claim 5, wherein
   a first time during which the piston moves from a top dead center to a bottom dead center is ten times or more than ten times a second time during which the piston moves from the bottom dead center to the top dead center.

8. A system comprising a lens of a camera and the foreign matter removal device according to claim 1, wherein the foreign matter removal device is configured to remove foreign matters on the lens of the camera.

9. A system comprising a partition wall interposed between an in-vehicle sensor and a measuring target of the in-vehicle sensor and the foreign matter removal device according to claim 1, wherein the foreign matter removal device is configured to remove foreign matters adhering to the partition wall interposed between the in-vehicle sensor and the measuring target of the in-vehicle sensor.

10. A vehicle comprising the foreign matter removal device according to claim 1.

11. A system comprising a lens of an in-vehicle camera attached to a vehicle and the foreign matter removal device according to claim 1, wherein
   the foreign matter removal device is configured to remove foreign matter from the lens of the in-vehicle camera attached to the vehicle so that the lens of the in-vehicle camera is exposed toward an outside of a body panel of the vehicle.

12. A foreign matter removal device comprising:
   a single-cylinder type reciprocating pump configured to generate high-pressure air; and
   a nozzle configured to suck air therefrom into the single-cylinder type reciprocating pump and to inject the high-pressure air toward a lens, wherein
   a volume of an internal space of the pump is 10 $cm^3$ or less, and
   exhaust time per cycle required for exhausting the air in the internal space is 0.03 seconds or less,
   wherein maximum flow rate of the pump in the exhaust per cycle of 0.03 seconds or less is 100 $cm^3/s$ or more.

13. A system comprising a lens of a camera and the foreign matter removal device according to claim 12, wherein the foreign matter removal device is configured to remove foreign matters on the lens of the camera.

14. The foreign matter removal device according to claim 13, wherein
   flow rate of the pump is 50 $cm^3/s$ or more during 0.02 seconds of the exhaust time required.

15. A system comprising a partition wall interposed between an in-vehicle sensor and a measuring target of the in-vehicle sensor and the foreign matter removal device according to claim 12, wherein the foreign matter removal device is configured to remove foreign matters adhering to the partition wall interposed between the in-vehicle sensor and the measuring target of the in-vehicle sensor.

16. A system comprising a lens of an in-vehicle camera attached to a vehicle and the foreign matter removal device according to claim 12, wherein
   the foreign matter removal device is configured to remove foreign matter from the lens of the in-vehicle camera attached to the vehicle so that the lens of the in-vehicle camera is exposed toward an outside of a body panel of the vehicle.

* * * * *